US008185277B2

(12) United States Patent
Flood et al.

(10) Patent No.: US 8,185,277 B2
(45) Date of Patent: May 22, 2012

(54) WASTE REMOVING AND HAULING VEHICLE

(75) Inventors: Christopher M. Flood, St. Charles, IL (US); Michael S. Fisher, Richardson, TX (US)

(73) Assignee: Advanced Custom Engineered Systems & Equipment Co., Carol Stream, IL (US)

( * ) Notice: Subject to any disclaimer, the term of this patent is extended or adjusted under 35 U.S.C. 154(b) by 689 days.

(21) Appl. No.: 12/267,340

(22) Filed: Nov. 7, 2008

(65) Prior Publication Data

US 2010/0119340 A1 May 13, 2010

(51) Int. Cl.
*G06F 7/70* (2006.01)

(52) U.S. Cl. ........................................... 701/50; 701/117

(58) Field of Classification Search .................... 701/50, 701/117

See application file for complete search history.

(56) References Cited

U.S. PATENT DOCUMENTS

| | | | | |
|---|---|---|---|---|
| 3,636,863 A | | 1/1972 | Woyden | |
| 4,854,406 A | * | 8/1989 | Appleton et al. | 177/139 |
| 4,953,109 A | | 8/1990 | Burgis | |
| 5,004,392 A | | 4/1991 | Naab | |
| 5,119,894 A | | 6/1992 | Crawford et al. | |
| 5,209,312 A | | 5/1993 | Jensen | |
| 5,222,853 A | * | 6/1993 | Carson | 414/408 |
| 5,230,393 A | | 7/1993 | Mezey | |
| 5,303,642 A | | 4/1994 | Durbin | |
| 5,304,744 A | | 4/1994 | Jensen | |
| 5,326,939 A | | 7/1994 | Schafer | |
| 5,401,915 A | | 3/1995 | Schafer | |
| 5,416,706 A | | 5/1995 | Hagenbuch | |
| 5,565,846 A | | 10/1996 | Geiszler et al. | |
| 5,631,835 A | | 5/1997 | Hagenbuch | |
| 5,644,489 A | | 7/1997 | Hagenbuch | |

(Continued)

FOREIGN PATENT DOCUMENTS

AU 2005211634 4/2007

(Continued)

OTHER PUBLICATIONS

Advanced Custom Engineered Systems & Equipment Co., International Search Report in co-pending PCT Application No. PCT/US2009/063601 mailed Mar. 12, 2010.

(Continued)

*Primary Examiner* — Toan To
(74) *Attorney, Agent, or Firm* — Ungaretti & Harris LLP

(57) ABSTRACT

A vehicle for removing and hauling waste has a waste bin located above a baseline. The waste bin has a chamber and an emptying site for receiving waste into the chamber. A waste receptacle transfer means is driven from a first position associated with the baseline to a second position associated with the emptying site of the waste bin and back to the first position. A waste receptacle is temporarily retainable to the waste receptacle transfer means and transferrable by the waste receptacle transfer means from the first position to the second position to spill contents of the waste receptacle into the waste bin at the emptying site and back to the first position. A first receiver is associated with the first position for receiving a signal generated by the waste receptacle at a first moment in time when the waste receptacle transfer means is in the first position and at a second moment in time when the waste receptacle transfer means has returned to the first position from second position.

22 Claims, 16 Drawing Sheets

U.S. PATENT DOCUMENTS

| | | | |
|---|---|---|---|
| 5,740,050 A | 4/1998 | Ward, II | |
| 5,837,945 A | 11/1998 | Cornwell et al. | |
| 5,861,805 A * | 1/1999 | Reeves | 340/539.23 |
| 5,947,256 A | 9/1999 | Patterson | |
| 6,191,691 B1 | 2/2001 | Serrault | |
| 6,206,282 B1 | 3/2001 | Hayes, Sr. et al. | |
| 6,302,461 B1 | 10/2001 | Debras et al. | |
| 6,412,406 B1 | 7/2002 | Flood et al. | |
| 6,448,898 B1 | 9/2002 | Kasik | |
| 6,510,376 B2 | 1/2003 | Burnstein et al. | |
| 6,601,015 B1 | 7/2003 | Milvert et al. | |
| 6,759,959 B2 | 7/2004 | Wildman | |
| 7,225,980 B2 | 6/2007 | Ku et al. | |
| 7,256,682 B2 | 8/2007 | Sweeney, II | |
| 7,275,645 B2 | 10/2007 | Mallett et al. | |
| 7,318,529 B2 | 1/2008 | Mallett et al. | |
| 7,436,303 B2 | 10/2008 | Tourrilhes et al. | |
| 7,501,951 B2 | 3/2009 | Maruca et al. | |
| 7,591,421 B2 | 9/2009 | Linton et al. | |
| 7,639,136 B1 | 12/2009 | Wass et al. | |
| 7,728,730 B2 * | 6/2010 | Langlois et al. | 340/572.1 |
| 7,870,042 B2 * | 1/2011 | Maruca et al. | 705/28 |
| 2002/0105424 A1 | 8/2002 | Alicot et al. | |
| 2002/0196150 A1 | 12/2002 | Wildman | |
| 2003/0031543 A1 | 2/2003 | Elbrink | |
| 2003/0069716 A1 | 4/2003 | Martinez | |
| 2004/0199401 A1 | 10/2004 | Wagner et al. | |
| 2006/0032917 A1 | 2/2006 | Ritter | |
| 2006/0208072 A1 | 9/2006 | Ku et al. | |
| 2006/0221363 A1 | 10/2006 | Roth et al. | |
| 2006/0253297 A1 | 11/2006 | Mallett et al. | |
| 2007/0033108 A1 | 2/2007 | Luhr | |
| 2007/0085676 A1 | 4/2007 | Lee et al. | |
| 2007/0112620 A1 | 5/2007 | Johnson et al. | |
| 2007/0227125 A1 | 10/2007 | Robertson et al. | |
| 2007/0260466 A1 | 11/2007 | Casella et al. | |
| 2007/0262878 A1 | 11/2007 | Maruca et al. | |
| 2007/0268759 A1 | 11/2007 | Sabino et al. | |
| 2008/0001746 A1 | 1/2008 | Childress et al. | |
| 2008/0010197 A1 | 1/2008 | Scherer | |
| 2008/0061125 A1 | 3/2008 | Langlois et al. | |
| 2008/0061977 A1 | 3/2008 | Maruca et al. | |
| 2008/0169342 A1 | 7/2008 | Gonen | |
| 2008/0197059 A1 | 8/2008 | Mallett et al. | |
| 2008/0197194 A1 | 8/2008 | Flood | |
| 2008/0198021 A1 | 8/2008 | Flood | |
| 2008/0202357 A1 | 8/2008 | Flood | |
| 2008/0211637 A1 | 9/2008 | Smith | |
| 2008/0237251 A1 | 10/2008 | Barber | |
| 2008/0275287 A1 | 11/2008 | Stevens et al. | |

FOREIGN PATENT DOCUMENTS

| | | | |
|---|---|---|---|
| AU | 2006225303 | | 4/2008 |
| DE | 19708204 | | 9/1998 |
| EP | 0500213 | A1 | 8/1992 |
| EP | 0557238 | A1 | 8/1993 |
| JP | 6-044483 | A | 2/1994 |
| JP | 7033455 | | 2/1995 |
| JP | 2003-246409 | | 9/2003 |
| JP | 2004-137042 | A | 5/2004 |
| JP | 2005-008339 | | 1/2005 |
| JP | 2005-063217 | | 3/2005 |
| JP | 2005-067850 | | 3/2005 |
| JP | 2006163324 | A | 6/2006 |
| JP | 2006-215857 | | 8/2006 |
| JP | 2007-063014 | | 3/2007 |
| KR | 10-2006-0005812 | A | 1/2005 |
| KR | 10-2006-0026226 | A | 3/2006 |
| WO | WO-98/38593 | | 9/1998 |
| WO | 99/39899 | A1 | 8/1999 |

OTHER PUBLICATIONS

International Search Report for PCT/US08/54571 mailed Aug. 14, 2008.

Supplementary European Search Report for EP 08730384 mailed Sep. 19, 2011.

* cited by examiner

WASTE REMOVING AND HAULING VEHICLE

CROSS-REFERENCE TO RELATED APPLICATIONS

N/A

FEDERALLY SPONSORED RESEARCH OR DEVELOPMENT

N/A

TECHNICAL FIELD

The invention relates to waste and refuse removing and hauling vehicles. More particularly, the present invention relates to waste and refuse removing and hauling vehicles having an on-board communication system for controlling, tracking, and monitoring movement of a waste or refuse receptacle relative to the vehicle.

BACKGROUND OF THE INVENTION

The collection and transportation of trash and recyclables from residential, commercial, industrial and large residential facilities is a major industry in the United States and throughout the civilized world. Typically, trash and recyclables are accumulated and temporarily stored in waste material receptacles such as trash cans and dumpsters. When filled, or at regularly scheduled intervals, trash and recyclables from the containers are transported for the eventual recycling, incineration and/or disposal into landfills.

Customers typically pay for trash and recyclables removal services based on the amount of trash and recyclables removed and the number of trash and recyclables pickups over a period of time. The compacting of trash and recyclables at a customer's location typically reduces the number of pickups. A successful trash and recyclables compactor is disclosed in U.S. Pat. No. 6,412,406, titled Trash Compactor and owned by Advanced Custom Engineered Systems & Equipment, Inc., Carol Stream, Ill.

These industrial, commercial and large residential bins and compactors are collected from different locations and hauled to a central location. Normally, those hauling the trash and recyclables are sent from a central location and dispatched to the different locations. In practice, paper logs or schedules document the hauler's runs (e.g., trash and recyclables to pick-up, trash and recyclables being picked-up, and trash and recyclables picked-up). The haulers are given their routes in person or over the phone. The haulers, in turn, keep in touch with the central location generally by cell phone or radio.

For large organizations this can be a very complicated task as there are many haulers and many customers needing their trash and recyclables collected, picked-up and hauled away. In addition, commercial, industrial and large residential (e.g., condos and apartment buildings) trash and recyclables compactors and balers must be monitored for maintenance and repair. This too requires time and energy for the haulers and/or representatives (of the service provider) to monitor and inspect.

It should also be recognized that these industrial, commercial and large residential bins, balers and compactors require both period maintenance and emergency demand repair services. Normally, those repairing the equipment are sent from a central location and dispatched to the different locations. In practice, paper logs or work orders document the repairperson's time (e.g., drive time, time spent performing the repairs, parts and materials used, etc.). The repair companies use a variety of management tools. For example, some are given their routes in person or over the phone. The service providers, in turn, keep in touch with the central location generally by cell phone or radio.

For large organizations this can be a very complicated to coordinate and to verify that the charges for these services are fair and accurate as there are many service providers and many customers needing their compactors, bins and balers repaired. In addition, commercial, industrial and large residential (e.g., condos and apartment buildings).

In addition, it must be recognized that trash and recyclables compactors, balers and bins must further be monitored for maintenance and repair.

Methods of improving the refuse collection are disclosed in commonly assigned and copending U.S. Patent Application Publication No. 2008-0197194 A1, published on Aug. 21, 2008; U.S. Patent Application Publication No. 2008-0198021 A1, published on Aug. 21, 2008; and U.S. Patent Application Publication No. 2008-0202357 A1, published on Aug. 28, 2008. These publications are hereby incorporated by reference as if fully set forth herein, and generally disclose systems for communicating with receptacles, etc.

One opportunity that exists with refuse removal is to improve communication between the vehicles making refuse pick-ups (emptying receptacles) and the central station or dispatcher. Currently, the dispatcher may be in contact with the vehicle via radio or telephone transmission. However, it is not cost-effective of feasible for the dispatcher to be in constant contact with every vehicle out in the field. Thus, it is impossible for the dispatcher to relay account information associated with each receptacle to a vehicle. In would be advantageous to provide such information to the vehicle to prevent pick-up and emptying of receptacles owned or managed by entities delinquent in their payment of invoices. Also, a given account may have special instructions, such as an additional oversized pick-up, for a discreet single day or event. The dispatcher currently has no way of assuring that the special instructions are provided to the vehicle in a timely manner.

Furthermore, there is on-going and growing concern in major municipalities with controlling several aspects refuse collection. For instance, citizens or users will often engage in activity with respect to refuse receptacles that violates municipal codes. Some of this is caused by simply overloading receptacles. Other times, a user may fall behind in payment of bills for removing refuse and waste, and the receptacles and surrounding areas will become over loaded with refuse. This provides a haven for vermin such as rats. It may also cause damage to the lane on which the receptacles are located.

Absent constant patrol of back lanes, municipalities often have no idea that these conditions exist until it is too late. Even when patrolling the back lanes, it is difficult to impossible to determine which receptacles belong to which owners/addresses. Finally, when a positive identification of the offending receptacle is able to be determined the process consumes so much time that the municipal employee is only able to investigate but a handful of the many violations that occur at any one time. Thus, city officials need a method that will facilitate receptacle identification while at the same time providing a simplified method of issuing citations to the proper entity responsible for the code violation.

The present invention is provided to solve the problems discussed above and other problems, and to provide advantages and aspects not provided by prior waste and refuse collection systems and apparatuses of this type. A full discussion of the features and advantages of the present invention is deferred to the following detailed description, which proceeds with reference to the accompanying drawings.

SUMMARY OF THE INVENTION

One aspect of the present invention is directed to a vehicle for removing and hauling waste. The vehicle comprises a waste bin, a waste receptacle transfer means, and a first receiver. The waste bin is located above a baseline and has a chamber and an emptying site. The waste receptacle transfer means is driven from a first position associated with the baseline to a second position associated with the emptying site of the waste bin and back to the first position. A waste receptacle is temporarily retainable to the waste receptacle transfer means and transferrable by the waste receptacle transfer means from the first position to the second position to spill or empty a contents of the waste receptacle into the waste bin at the emptying site and back to the first position. The first receiver is associated with the first position for receiving a signal generated by the waste receptacle at a first moment in time when the waste receptacle transfer means is in the first position and at a second moment in time when the waste receptacle transfer means has returned to the first position from second position.

A second aspect of the invention is directed to a vehicle for removing and hauling waste. The vehicle comprises a waste bin, a receptacle transfer means having a motorized arm extending outwardly from the vehicle, and first and second receivers. The waste bin is located above a baseline. The waste bin has a chamber and an emptying site. The arm of the transfer means is driven from a first position associated with the baseline to a second position associated with the emptying site of the waste bin and back to the first position. A waste receptacle is temporarily retainable to the arm and transferrable by the arm from the first position to the second position to spill a contents of the waste receptacle into the waste bin at the emptying site and back to the first position. The first receiver is associated with the first position of the arm for sensing a signal generated by the waste receptacle. The second receiver is associated with the second position of the arm for sensing the signal generated by the waste receptacle.

A third aspect of the invention is also directed to a vehicle for removing and hauling waste. This vehicle comprises a waste bin, a waste bin transfer means, and a first receiver. The waste bin is located above a baseline and has a chamber and an emptying site. The waste bin transfer means is driven from a first position associated with the baseline to a second position located above the baseline on the vehicle, wherein the waste bin is temporarily retainable to the waste bin transfer means and transferrable by the waste bin transfer means from the first position to the second position to fix the waste bin at the second position on the vehicle for transporting the waste bin to a new location. The first receiver is associated with the first position for sensing a signal generated by the waste bin at a first moment in time when the waste bin is in the first position.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
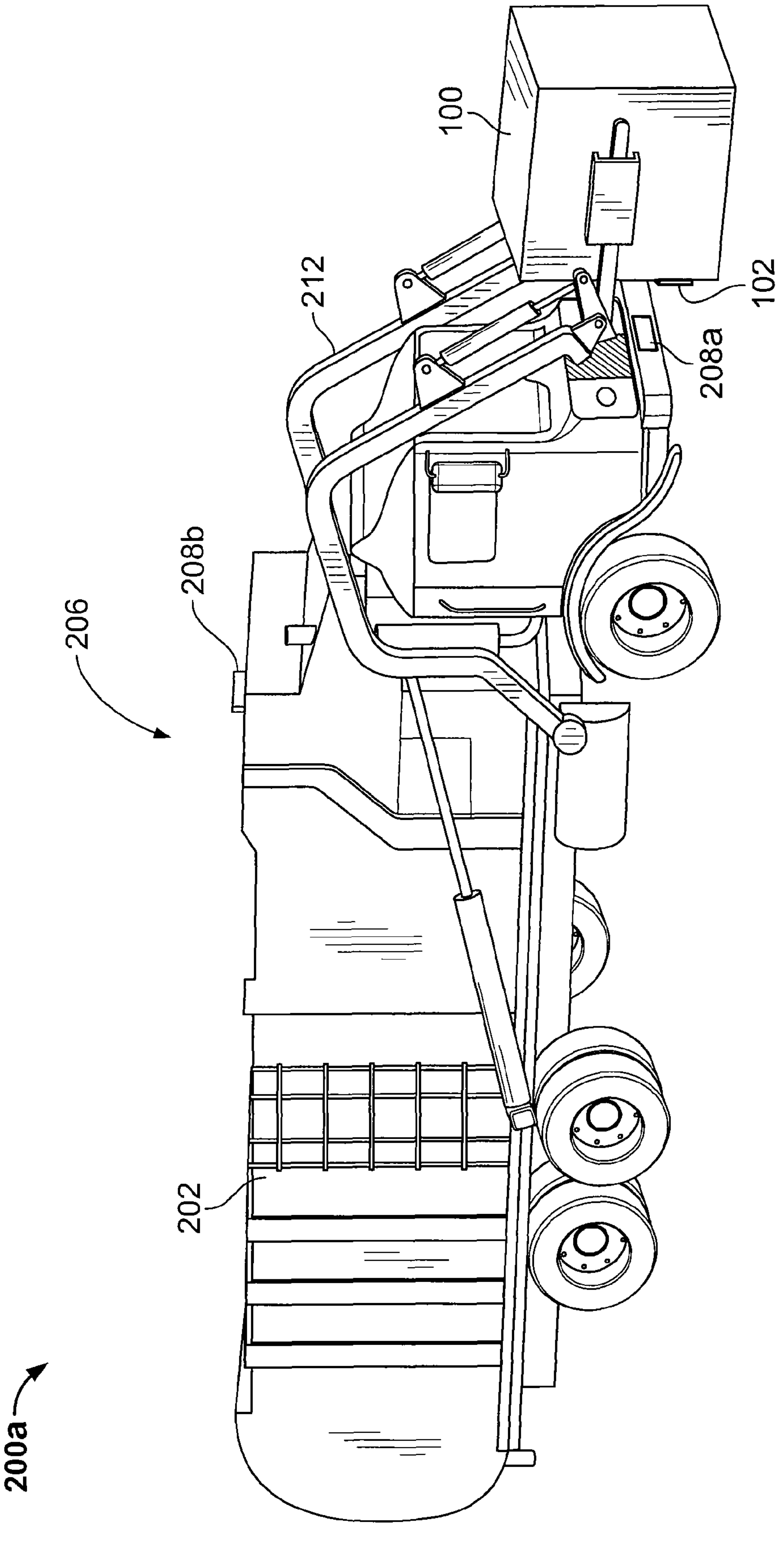
FIG. 1 is a perspective view of a waste removal and hauling vehicle of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIGS. 1-16, the present invention is directed to waste removal and hauling vehicles and systems or methods incorporating such vehicles with sensors and an operational network to facilitate proper, efficient and effective waste monitoring and collection. The inventors contemplate that the present invention will provide a means for municipalities to more effectively police violation of municipal codes in connection with commercial and residential waste collection and removal. The inventors further contemplate that the present invention will provide more effective communication between waste hauling vehicles and a dispatcher located at an external site. As best illustrated by the block diagram in FIG. 16, the overall system of the invention 10 comprises a receptacle 100, preferably a plurality of receptacles located at a plurality of locations throughout a municipality, a refuse or waste hauling vehicle 200, an external site 300, typically a central station, management office, dispatcher or the like, and a handheld reader/printer transmitter means 400 used in an example of a municipal functionality.

Each receptacle 100 is outfitted with a means of communicating or transmitting a signal carrying an identifier associated with the receptacle 102, such as a radio frequency identification (RFID) tag. RFID tags are well-known in the retail industry for identifying products. In particular, an RFID tag or transponder is an object applied to or incorporated into a product for the purpose of identification using radio waves. Most RFID tags contain at least two parts, namely an integrated circuit for storing and processing information, modulating and demodulating a (RF) signal and an antenna for receiving and transmitting the signal. RFID tags come in three general varieties: passive, active, or semi-passive (also known as battery-assisted). Passive tags require no internal power source, thus being pure passive devices (they are only activated when a reader is nearby to power them), whereas semi-passive and active tags require a power source, usually a small battery. While the present discussion focuses on passive RFID tags, it is recognized that a similar system can be used for active and semi-active RFID tags.

The RFID tags may transmit high frequency (HF) signals, low frequency signals (LF), or ultra high frequency (UHF) signals. The characteristics of these signals differ, and one particular frequency may be more advantageous than another based on the particular application of the system. For instance, low frequency signals have a short read range (distance) which would prevent errors or false reads. UHF signals can have a read range that is very short to very wide (any yards or meter).

While RFID, and in particular passive RFID tags are discussed herein, it is recognized that other identifying or alerting tags can be used. Many are known and perhaps others in the future. For example, electrical article surveillance (EAS) tags can be used. EAS tags are commonly used to prevent shoplifting from retail stores. The EAS tags are attached to merchandise and are removed or deactivated by the clerks when the item is properly bought or checked out. At the exits of stores, a detection system sounds an alarm or otherwise alerts the staff when it senses active tags. These tags are typically made of a strip of amorphous metal (metglas) having a low magnetic saturation value. This strip is also lined with a strip of ferromagnetic material with a coercive field (magnetic "hardness"). Detection is achieved by sensing harmonics and sum or difference signals generated by the non-linear magnetic response of the material under a mixture of low-frequency (in the 10 Hz to 1000 Hz range) magnetic fields.

When the ferromagnetic material is magnetized, it biases the amorphous metal strip into saturation, where it no longer produces harmonics. The tags are activated by demagnetization and deactivated with magnetization.

The identifier associated with the receptacle is preferably a discreet identifier which is assigned to the receptacle 100. The identifier information is stored on a database typically located at the external site 300, and electronically joined with an account to which the receptacle 100 belongs. In other words, account information is housed on a database located at the external site 300. Each account has one or more receptacle identifiers associated with it, and the database carries with it information typical to the management of any business account, for example, special instructions, accounts receivable, last receipt, last invoice, amount in arrears, days since last payment, historical account information, contact information, owner, etc.

Figure 17:
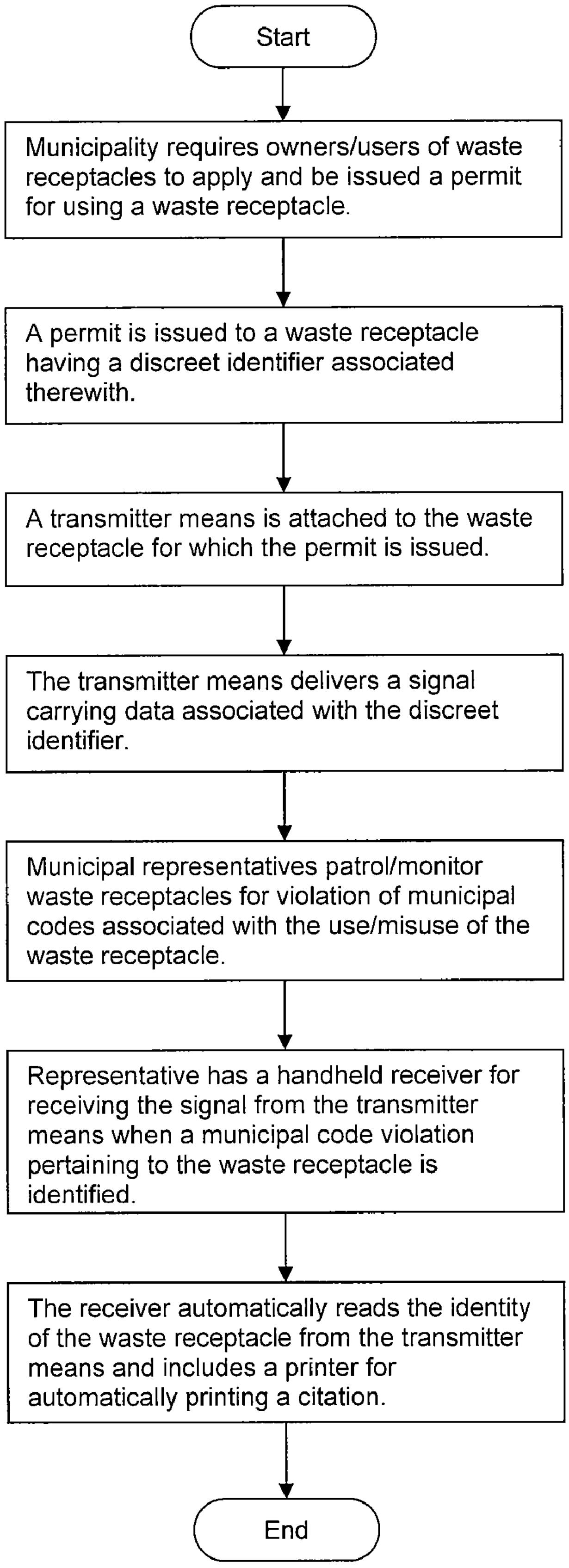
FIG. 17 is a flowchart illustrating a method by which a municipality may use principles and concepts of the present invention to control, track, and monitor waste or refuse receptacles.

As illustrated in FIG. 17, the inventors also foresee the means for communicating or transmitting 102 as being supplied by municipalities on a permit basis to citizens. This would provide several advantages. First, the permit process would provide an unexpected source of income to the municipality because the typical permit granting process comes with an associated government fee. Secondly, it would provide a means by which the municipality can easily track ownership of or responsibility for the receptacle. Thirdly, because ownership of the receptacle would be stored on the database created during the permit process, citations for misuse, neglect, damage, etc. can be easily, swiftly, and electronically generated using a handheld receiver with printer for generating citations, providing yet a further stream of income to municipalities as well as improving lane conditions, thus reducing the likelihood of infestation by vermin. In addition, sanitation inspectors would be more productive due to the automation provided by the handhelds readers in combination with the communication means, preferably RFID tags.

As set forth above, this aspect of the invention directly results in cleaner streets and alleys. The invention will eliminate or reduce trash overages, under size containers, poor container maintenance condition, e.g. no lid. Permits and citations will force compliance. Users can specify correct container size, schedule additional pick-ups. Service may be halted due to lack of payment or by schedule.

Information regarding each permit/receptacle identifier, the account associated therewith, and the entity responsible for the account/permit/receptacle is stored on a managed database. The database may include other information such as hauler name, permit number and container asset number (human readable sticker and RFID tag). Use and access of the database is explained in more detail below.

The RFID tags can be read by inspectors having mobile and/or handheld computers 400. Citations may be issued immediately via printer on the handheld 400 and/or mailed with back-up violation data. Inspectors and other municipal employees use mobile handheld RFID readers with cameras to read tags and report violations. Citations can be issued and wireless transmission of data achieved through the handhelds 400.

This aspect of the invention requires haulers or receptacle owners to purchase annual container permits. The issued permit includes a means for transmitting, such as an RFID container tag. Revenue to the municipality is generated by an enforcement program.

Further, a container registration fee includes RFID tagging. The RFID tag information is linked to customer and hauler information in the database.

Referring to FIG. 1-8, various vehicles 200*a-d* used in conjunction with the system 10 of the invention are illustrated. These vehicles 200*a-d* are intended to be examples of the types of waste removing and hauling vehicles used to transport refuse today, and the broad aspects of the invention should not be limited to the specific examples unless otherwise claimed. It should also be understood that the vehicles 200*a-d* and related concepts of the external site 300 and the receptacle 100 can be used alone or, more importantly, in combination with the municipal permitting concepts described above Each of the vehicles 200*a-d* includes a waste bin 202 located above a baseline upon which the vehicle 200*a-d* is supported, generally the ground. The waste bin 202 includes a chamber 204 and an emptying site 206. The refuse within the receptacles 100 is loaded into the chamber 204 via the emptying site 206. One of ordinary skill in the art of waste hauling would readily understand this method of refuse handling without further description as it is the standard procedure employed in the art.

Figure 13:
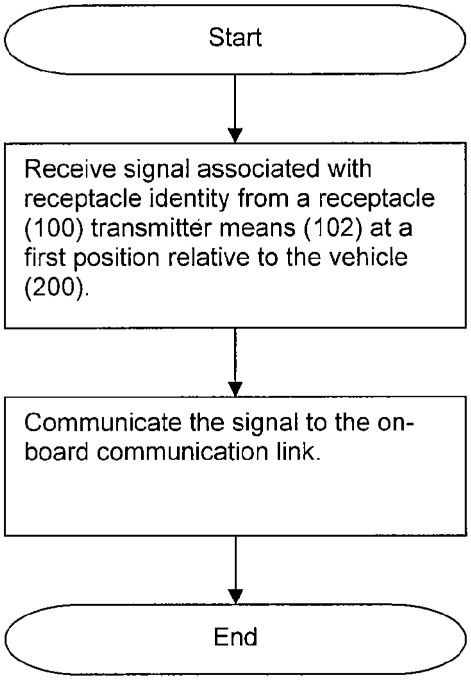
FIG. 13 is a flowchart of a process of a first receiver located at a first position on a waste removal and hauling vehicle.
Figure 14:
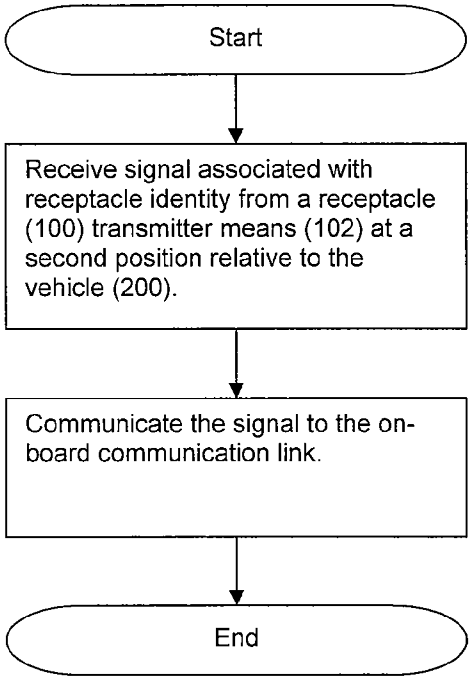
FIG. 14 is a flowchart of a process of a second receiver located at a second position on a waste removal and hauling vehicle.

The vehicles 200*a-d* are further outfitted with at least one receiver 208*a*, in most cases a plurality of receivers 208*a,b* and preferably two. The receivers 208*a,b* may be sensors, transducers, or antennae, or any combination thereof. As illustrated in FIGS. 13 and 14, preferably, the receivers 208 receive the signal from the transmitting means 102 on the receptacles 100 and send a corresponding signal via wire, wireless, or any other medium to an on-board communication or data link 210. The signal from the receiver 208*a,b* may be response signal to the energy in the form of the signal transmitted by the transmitter means 102, or the signal may simply be a pass through signal, including conversion from a wireless signal to a signal carried by another medium such as a wire. In either case, all or a part of the signal from the receivers 208 to the data link are associated with the actual identity or the discreet identifier associated with the each receptacle 100. In the case where a separate response signal to the transmitter means 102 is generated, the response signal may carry additional information such as location of the particular receiver 208*a,b* generating the signal, etc.

The locations chosen for the receivers 208*a,b* are extremely important because the receivers 208*a,b* are used for several different purposes, including for possible tracking of the receptacle 100 as it is transferred from position-to-position relative to the vehicle 200*a-d* by a means for transferring the receptacle 212, which may be automated systems known in the art, as shown in FIGS. 1-8, comprising mechanical arms, booms, or the like extending outwardly from the vehicle 200 to which a waste receptacle 100, or a waste bin 202 in the case of a roll-off vehicle 200*d r* or manual systems also known in the art. For instance, in a conventional refuse collection and hauling vehicles 200*a-d* illustrated in FIGS. 1-8, a first receiver 208*a* is located at a position where reception of the signal from the transmitter means 102 can be promoted prior to unloading or emptying of the receptacle. As shown in the FIGS. 1-8, the first location or position is typically where the receptacle 100 is engaged by the means for transferring the receptacle 212 prior to the receptacle 100 being transported to the emptying site 206 by the means for transferring 212.

Figure 2:
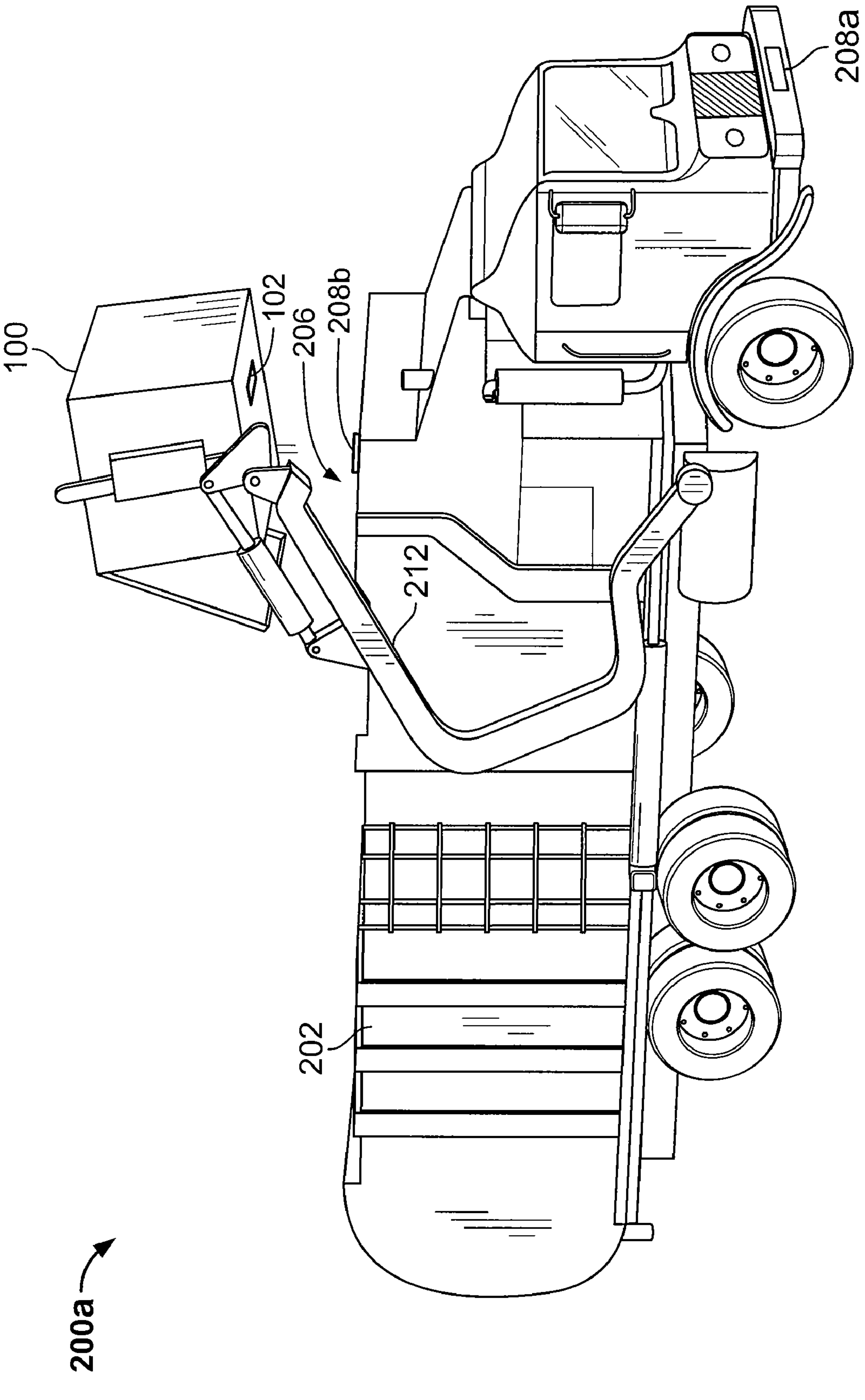
FIG. 2 is a perspective view of the vehicle of FIG. 1 with a waste receptacle in an unloading position.

The preferred location of the first receiver 208*a* on a front loading vehicle 200*a*, illustrated in FIGS. 1 and 2, is on the front of the vehicle 200*a* below the windshield and centered between opposing ends or sides. The first receiver 208 may be recessed or spaced from the bumper such that accidental collision with an obstacle would not damage the receiver. Accordingly, the first receiver 208*a* may be located within or protected by the shell of the vehicle 200*a* as long as the receiver 208*a* is capable of achieving its purpose. One example of such a location may be behind the vehicle radiator grill. In any event, the first receiver 208*a* is associated with the means for transferring the receptacle 212 when the receptacle is in a first position. As illustrated, the means for transferring 212 comprises a pair of arms with grasping hooks for engaging corresponding handles on the receptacle 100.

Figure 9:
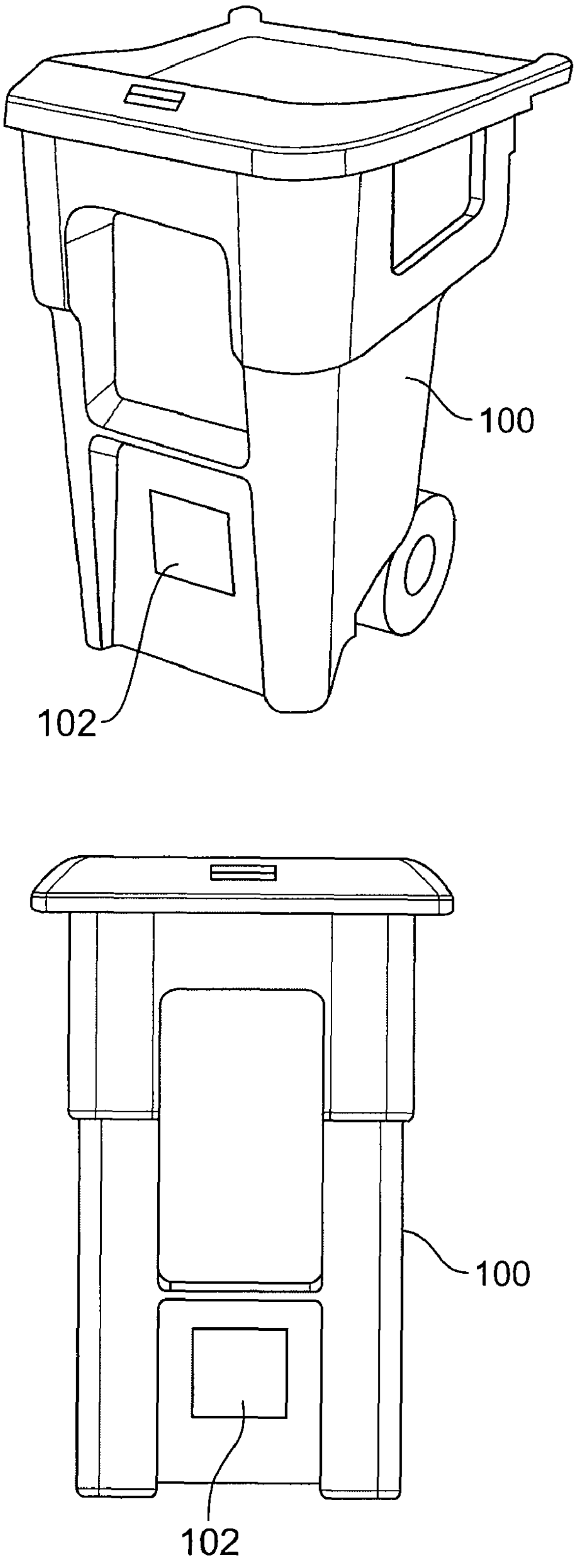
FIG. 9 is a front and rear perspective view of a receptacle showing placement of a communication means.

FIGS. 3-6 show vehicles emptying a certain type of receptacle 100. This type of receptacle 100 is illustrated in FIG. 9 to show a placement position for the communication means 102 which may not be evident from FIGS. 3-6.

Figure 3:
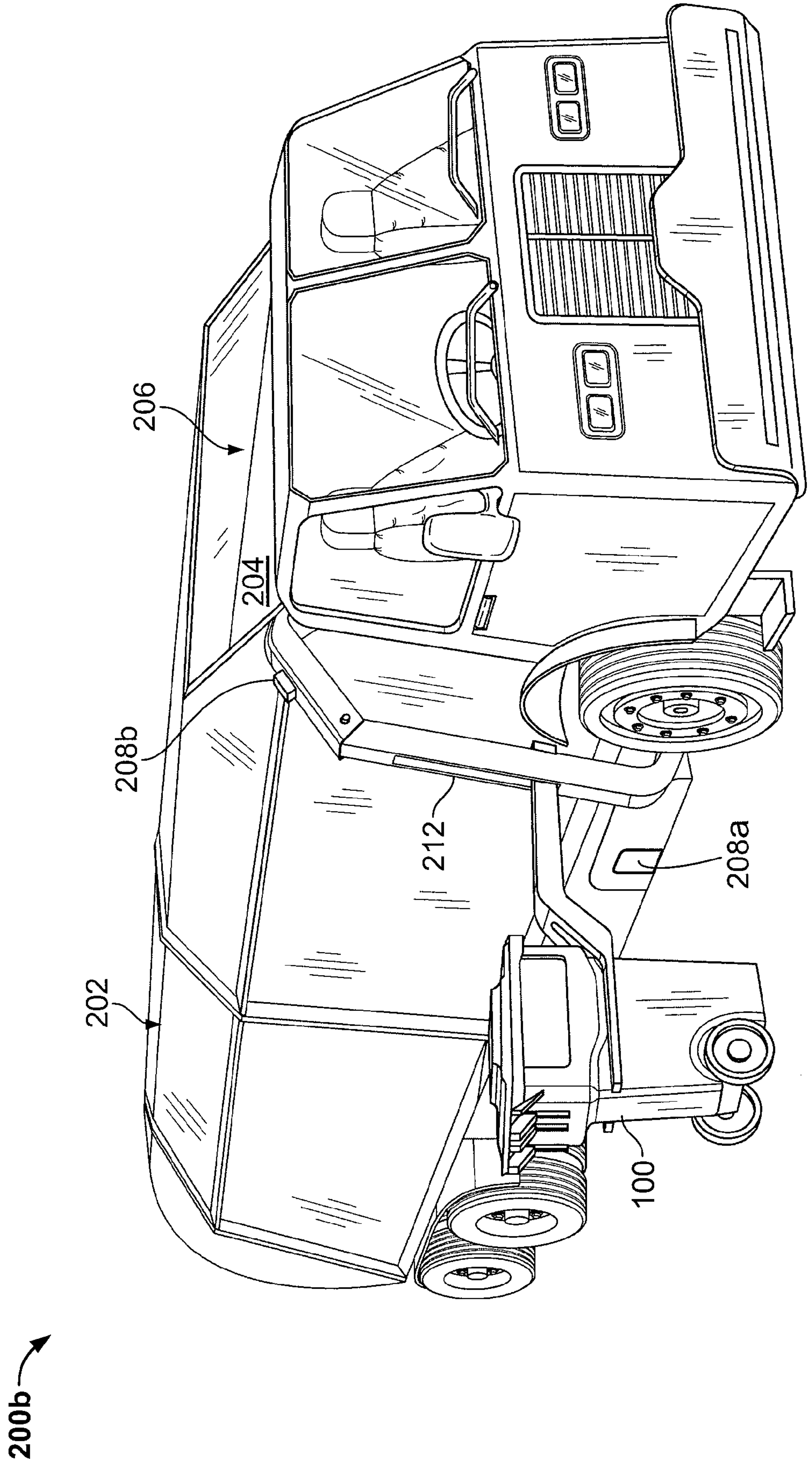
FIG. 3 is a perspective view of a second waste removal and hauling vehicle of the present invention.
Figure 4:
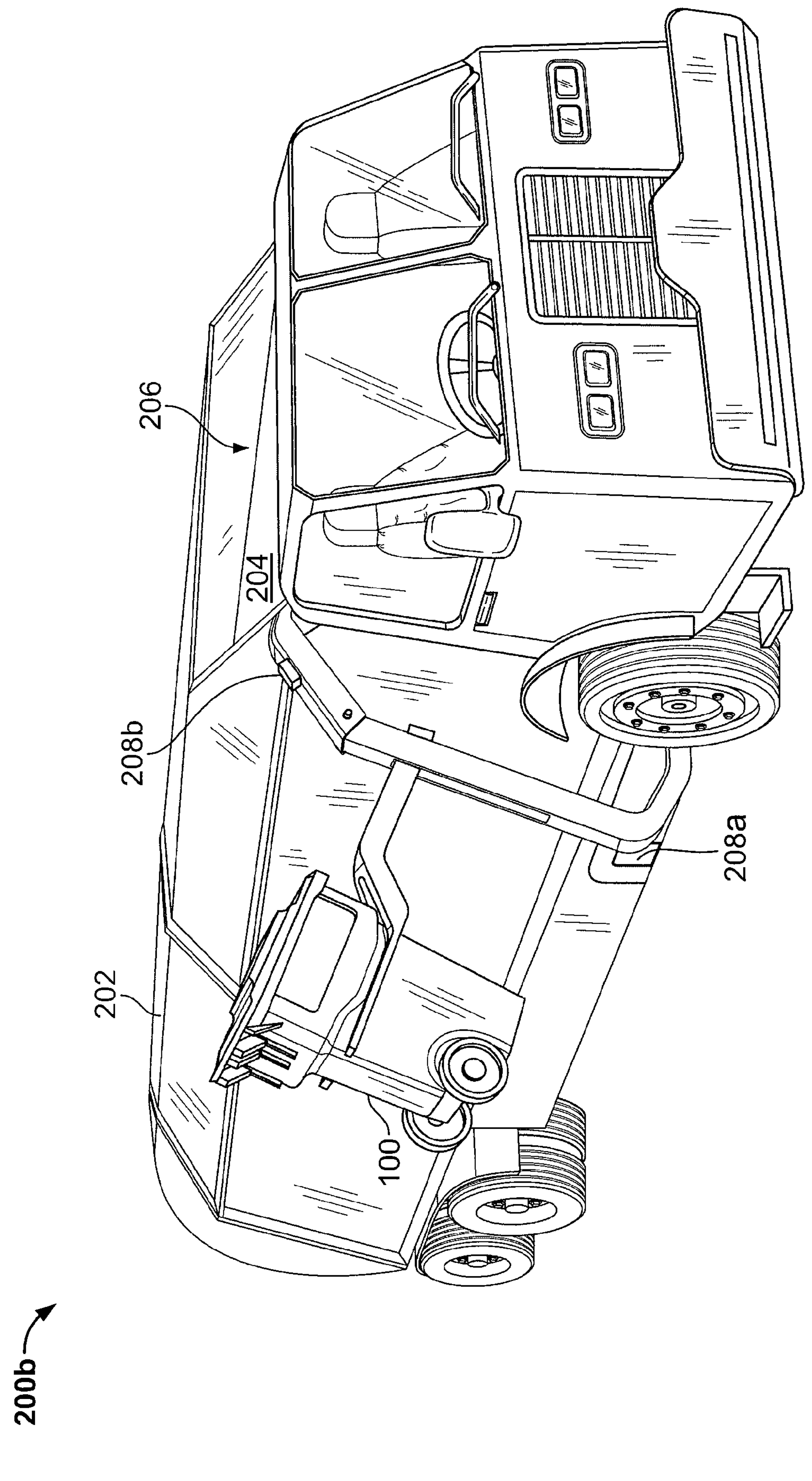
FIG. 4 is a perspective view of the vehicle of FIG. 3 with a waste receptacle in a second position.

The preferred location for the first receiver 208*a* on a side loading vehicle 200*b*, illustrated in FIGS. 3 and 4, is on a side of the vehicle corresponding to a side of the vehicle where the receptacle 100 would be located prior to or just as the means for transferring the receptacle 212 engages the receptacle 100. This location is typically on the passenger side adjacent the transfer means 212. This includes either just behind the cab or on the cab to the rear of the passenger side door. The first receiver 208*a* may be protected by locating on the passenger side and behind the cab, such that the receiver is protected by the cab and the waste bin 202.

Figure 5:
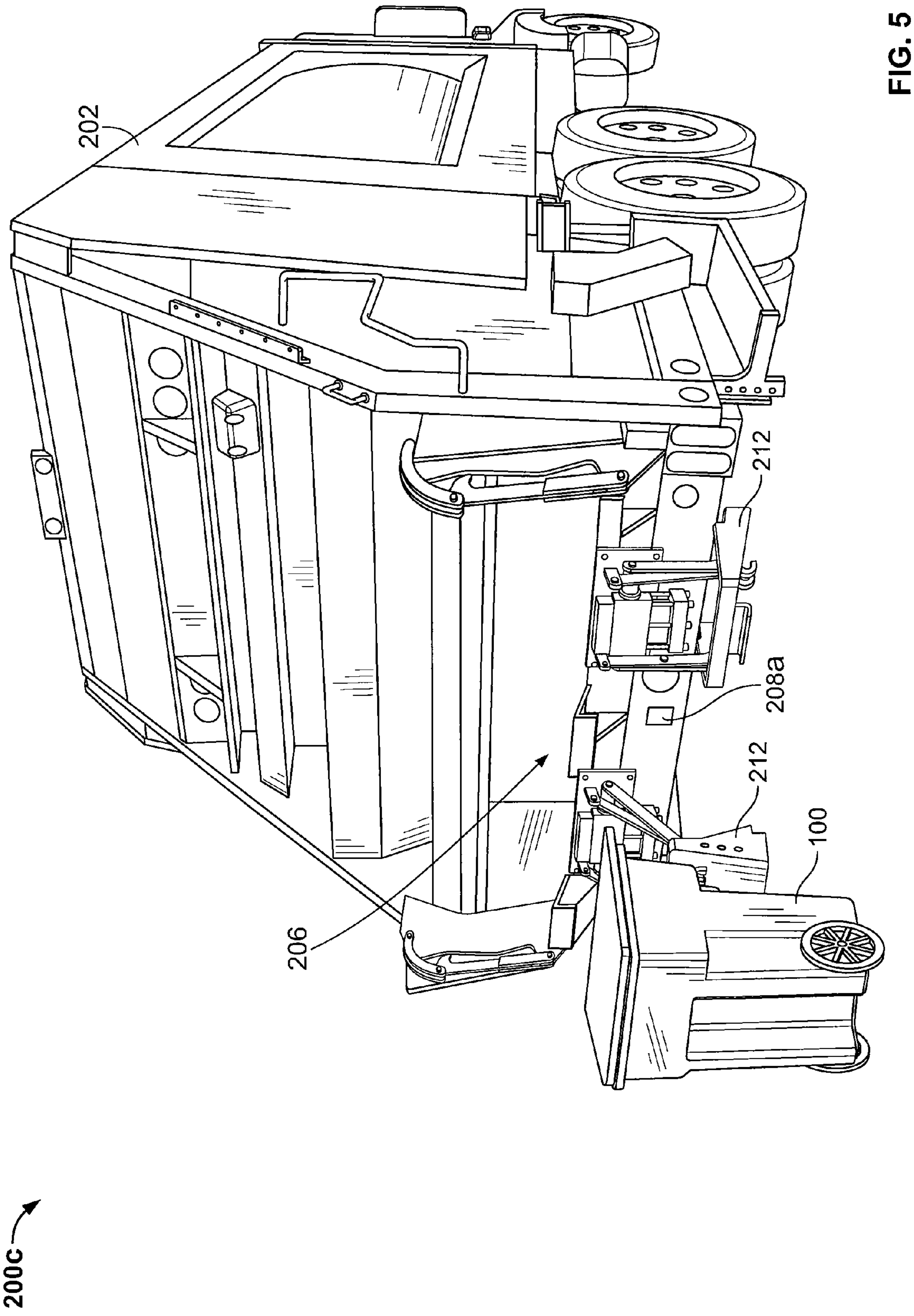
FIG. 5 is a perspective view of a third waste removal and hauling vehicle of the present invention.
Figure 6:
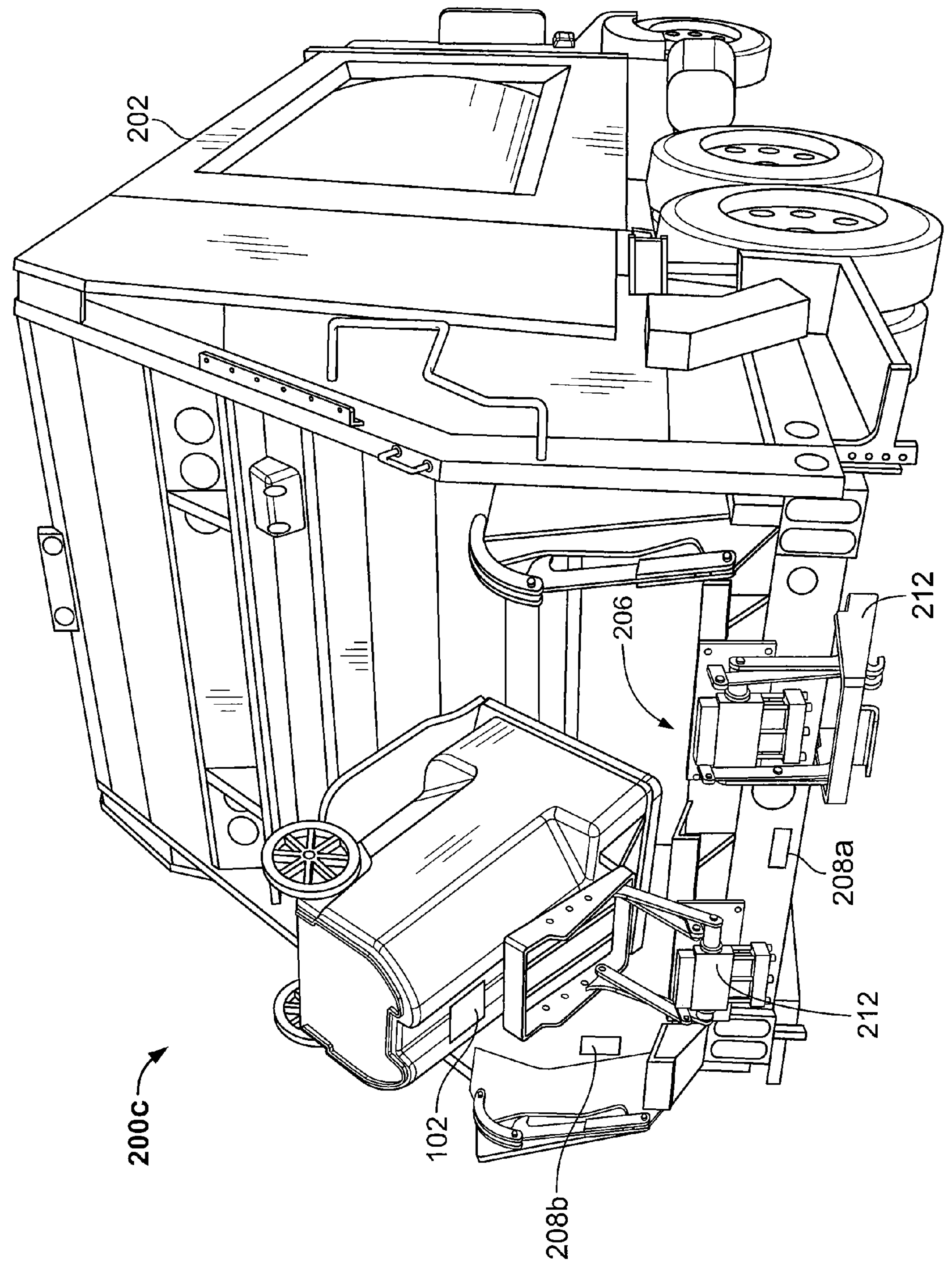
FIG. 6 is a perspective view of the vehicle of FIG. 5 with a waste receptacle in a second position.

The preferred location of the first receiver 208*a* on a rear loading vehicle 200*c*, illustrated in FIGS. 5 and 6, is at the rear of the vehicle 200*c* above the baseline, between the tail lights, but below the emptying site 206. Thus, as receptacles 100 are transported to the vehicle 200*c* for emptying at the emptying site 206, the communication means 102 may be positioned such that the first receiver 208*a* may receive the signal from the communication means 102 without difficulty. These types of vehicles 200*c* may or may not be outfitted with an automated means for transferring receptacle 212. The example shown in the drawings exhibits such an automated system.

Figure 7:
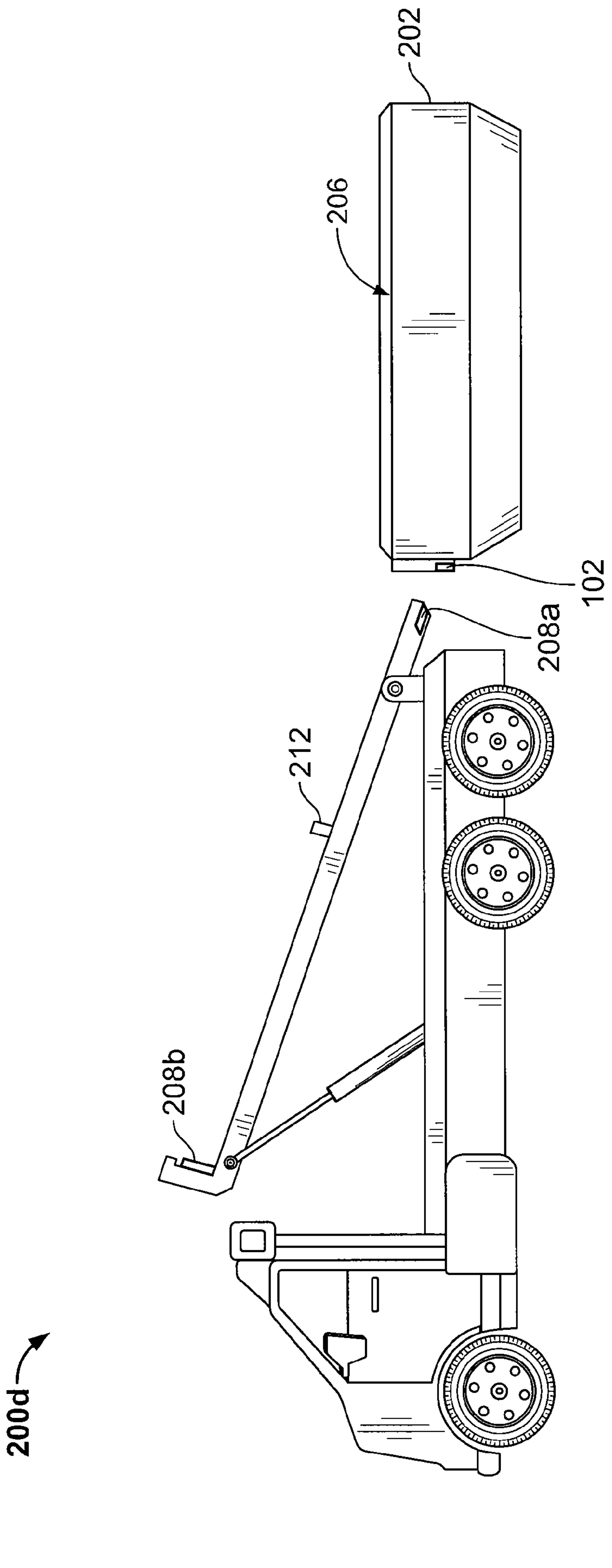
FIG. 7 is a perspective view of a fourth waste removal and hauling vehicle of the present invention.
Figure 8:
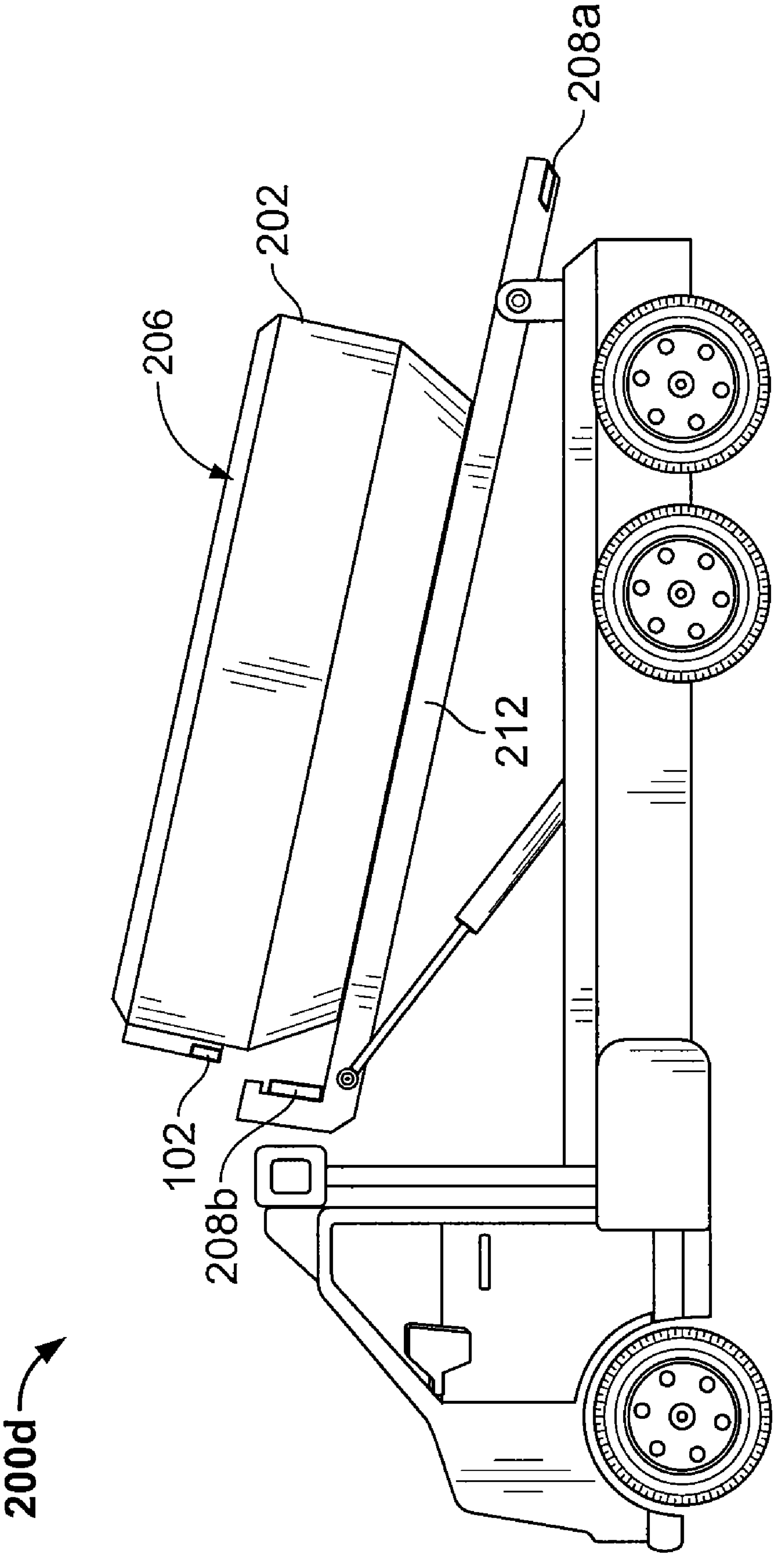
FIG. 8 is a perspective view of the vehicle of FIG. 7 with a waste receptacle in a second position.

The preferred location of the first receiver 208*a* on a roll-off vehicle 200*d*, illustrate in FIGS. 7 and 8, is similar to the location on rear loading vehicles 200*c*, namely at the rear of the vehicle 200*d*, above the baseline and between the tail lights of the vehicle 200*d* where the means for transferring 212 first engages the waste bin 202. Although one of ordinary skill in the art would readily recognize this point, it should be noted that a roll-off vehicle 200*d* differs from the other vehicles 200*a-c* in that the waste bin 202 also acts as the receptacle. Thus, the transfer means 212 does not transfer and dump a receptacle. Rather, it engages a waste bin 202 and loads it onto the vehicle 200*d* bed. It follows that the transmitter means 102 would be located on the waste bin 202, preferably on the forward or front facing wall as shown in the drawings.

The vehicles 200*a-d* also include a second receiver 208*b* located at a position where reception of the signal from the transmitter means 102 can be promoted either at the instant of receptacle unloading or just prior or just subsequent to receptacle unloading. Accordingly, this second location is typically adjacent the emptying site 206 to the chamber 204 and in alignment with the first receiver. The phrases "in alignment with the first receiver 208*a*," "aligned with the first receiver 208*a*," and the like are intended to include a position wherein a path of the receptacle and the means for transmitting 102 taken from the first position at the first receiver 208*a* to a second position at the second receiver 208*b*, as determined by the means for transferring the receptacle 212 included on the vehicles 200*a-c*, naturally brings the means for transmitting 102 to a location where the second receiver 208*b* can receive the signal from the means for transmitting 102, i.e. into a range of the second receiver 208*b* where reception is achieved.

The preferred location of the second receiver 208*b* on a front loading vehicle 200*a*, illustrated in FIGS. 1 and 2, is on the front of the vehicle 200*a* above the windshield and preferably above the cab, approximately aligned with the first receiver 208*a*. The second receiver 208*b* may be attached to the roof of the cab or closer to the emptying site 206, which is an opening on the vertically upper surface of the bin 202, on a portion of the bin 202 just behind the cab and aligned with the first receiver 208*a*. The second receiver 208*b* may be located within or protected by the shell of the vehicle 200*a* or the bin 202 as long as the receiver 208*b* is capable of achieving its purpose.

The preferred location for the second receiver 208*b* on a side loading vehicle 200*b*, illustrated in FIGS. 3 and 4, is on a side of the vehicle corresponding to a side of the vehicle where the receptacle 100 would be located and elevated above the position of the first receiver 208*a*. This location is typically on the passenger side either just behind the cab or on the cab to the rear of the passenger side door, either on the roof of the cab, on the rear of the cab adjacent the roof, or on some other portion of the vehicle 200*b*, such as an upper, stationary portion of the transfer means 212 as illustrated. In any case, the second receiver 208*b* is aligned with the first receiver

208*a* as determined by the path of the receptacle 100 provides by the means for transferring the receptacle 212.

The preferred location of the second receiver 208*b* on a rear loading vehicle 200*c*, illustrated in FIGS. 5 and 6, is at the rear of the vehicle 200*c* above the baseline, between the tail lights, and above the first receiver site 208*a* and aligned therewith.

The preferred location of the second receiver 208*b* on a roll-off vehicle 200*d*, illustrate in FIGS. 7 and 8, is generally some portion of the vehicle 200*d* adjacent to where the front face of the bin 202 having the transmitter means 102 is located once the bin 202 is loaded onto the vehicle 200*d*. This may be on the back of the cab adjacent to where the means for transmitting 102 on the waste bin 202 is positioned once the transfer means 212 positions the waste bin 202 on the vehicle 200*d*, or it may be on a forward portion of transfer means 212 as illustrated. Again, the second receiver 208*b* is preferably aligned with the first receiver 208*a*.

Figure 16:
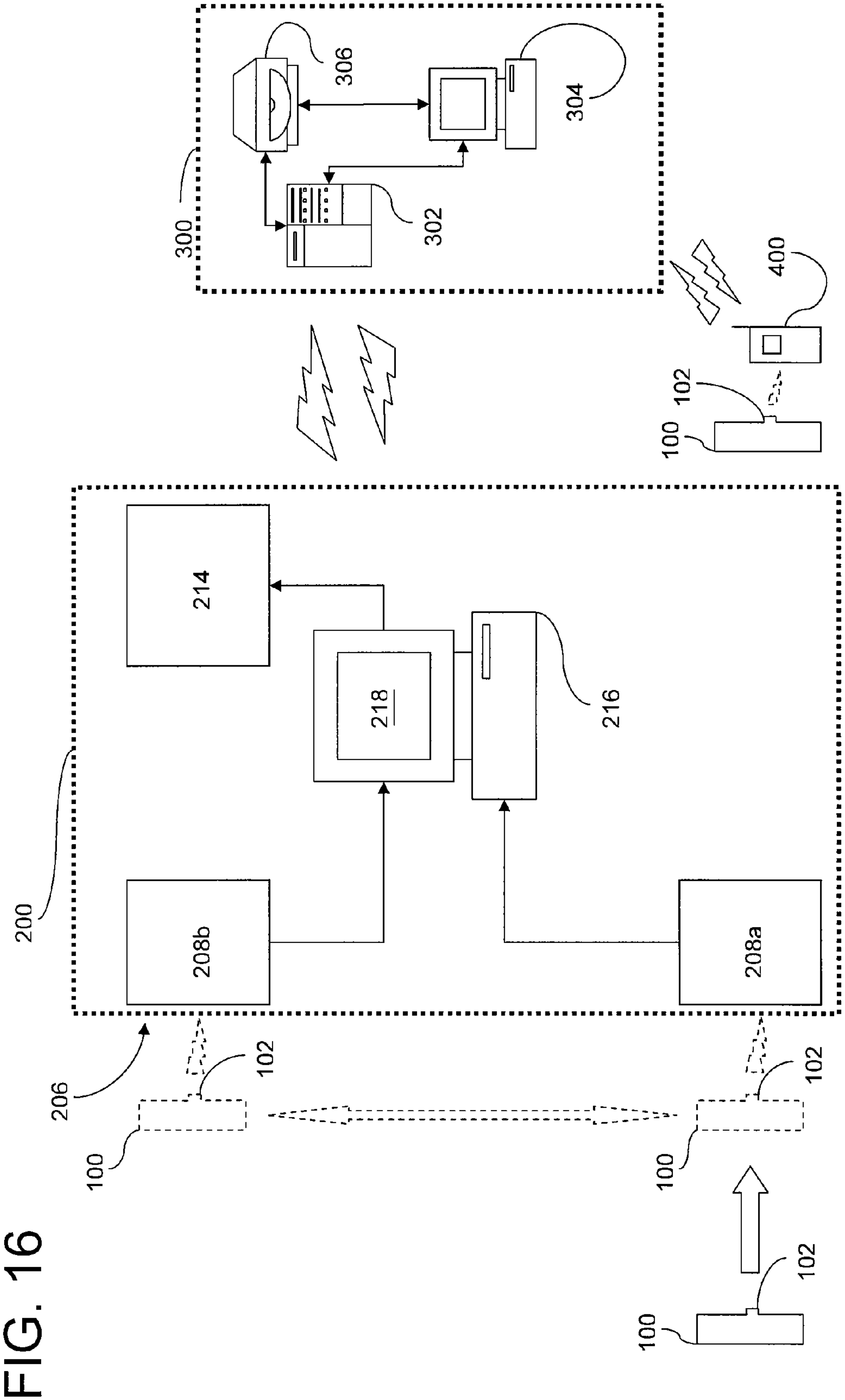
FIG. 16 is a block diagram illustrating an apparatus and a method of the present invention.

As shown in the block diagram of FIG. 16, the vehicle 200 has a controller 214, for activating and deactivating the means for transferring the receptacle 212, in communication with an on-board computer 216. The on-board computer 216 has a graphic interface 218 and provides the data or communication link to the external site 300 via modem or some other communication device. The controller 214 may also be a module within the on-board computer without departing from the spirit of the invention. Communication to and from the external site 300 is shown as wireless communication. The first and second receivers 208*a,b* are illustrated as spaced wherein as the transmitting means 102 traverses toward the first receiver 208*a*, the first receiver 208*a* receives the signal from the transmitter means 102. Likewise, as the receptacle 100 is transferred to the second position where the second receiver 208*b* is located, the second receiver 208*b* receives the signal from the transmitter means 102. Movement of the receptacle 100 and the associated signal are shown in dashed lines.

The external site 300 may include a server 302 in communication with computer 304 and a database 306, typically on the computer 304. Of course, the server 300 is not required to be at the same physical site as the computer 304, nor is it required for the database 306 to be stored on a computer separate from the server 302. The block diagram is merely an example of a possible layout. The only requirement for the external site 300 is the database 306 and a means for communication between the vehicles and database 306.

Now, as illustrated in flowcharts of FIG. 10-15, the various components of the system, the receptacle 100, the vehicle 200, and the external site 300, work together to provide an overall apparatus, the elements of which were described above, and a method for removing and hauling waste.

Figure 10:
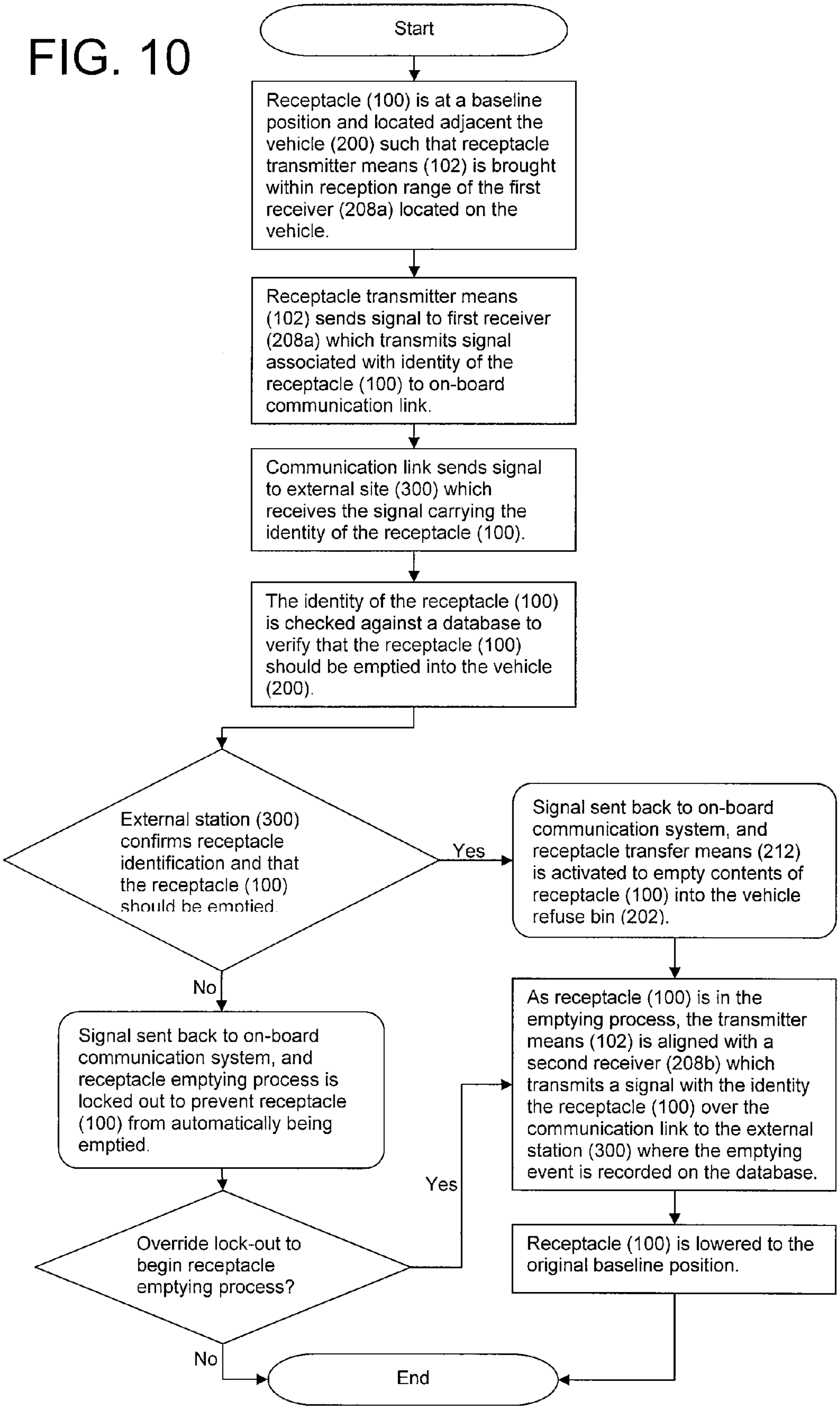
FIG. 10 is a flowchart of a method of the present invention.

Referring to FIG. 10, first, a receptacle 100 is located at a baseline position adjacent the vehicle 200 such that means for transmitting 102 is brought within the reception range with the first receiver 208*a*. The transmitter means 208*a* sends a signal carrying discreet receptacle identifier information to the receiver 208*a*. The receiver 208*a* either passes the signal directly to the on-board communication link, preferably a module of the on-board computer 216, or generates a new signal based on the signal received from the means for transmitting, but still including some type of receptacle identifier.

Next, the communication link sends a signal, either pass though or new, to the external site which receives the signal. The identity of the receptacle 100 is checked against an account database 306 to verify that the receptacle 100 should be emptied into the vehicle 200. A signal is generated indicating the account status associated with the receptacle identifier.

If the account is in good standing (pass condition), the controller 214 for the means for transferring the receptacle 212 is automatically activated either by a module or routine on the on-board computer or on the external computer 304. The means for transferring the receptacle 212 transports the receptacle 100 to the emptying site 20 where the transmitter means 102 is within reception range of the second receiver 208*b*. The transmitter means 102 sends a signal carrying discreet receptacle identifier information to the receiver 208*b*. The receiver 208*b* either passes the signal directly to the on-board communication link, preferably a module of the on-board computer 216, or generates a new signal based on the signal received from the means for transmitting, but still including some type of receptacle identifier. The triggered or pass through signal from the second receiver 208*b* represents an event. The event is preferably the emptying of the receptacle 100 into the vehicle bin 202. This event is recorded on the database 306 at the external site 300 and associated with the receptacle account.

If the account is not in good standing (fail condition), the controller 214 is not activated, a signal carrying an alarm or warning is transmitted to the vehicle 200. The account status can also be displayed on the on-board graphic interface 218. As a result, the transfer means 212 is not activated, and the receptacle 100 is not emptied into the vehicle bin 202. However, if for some reason, such as immediate, on-the-spot payment of an invoice by a customer, the vehicle personnel are inclined to empty the receptacle 100, vehicle personnel may override the alert and manually engage/energize the transfer means 212. In this case, as illustrated on the right hand side of FIG. 10, transmitter means 102 sends a signal carrying discreet receptacle identifier information to the second receiver 208*b*. The second receiver 208*b* either passes the signal directly to the on-board communication link, preferably a module of the on-board computer 216, or generates a new signal based on the signal received from the means for transmitting, but still including some type of receptacle identifier. The triggered or pass through signal from the second receiver 208*b* represents an event. The event is preferably the emptying of the receptacle 100 into the vehicle bin 202. This event is recorded on the database 306 at the external site 300 and associated with the receptacle account. The first receiver 208*a* may send an additional signal at a second moment in time when the receptacle 100 at is returned to the first position.

Figure 11:
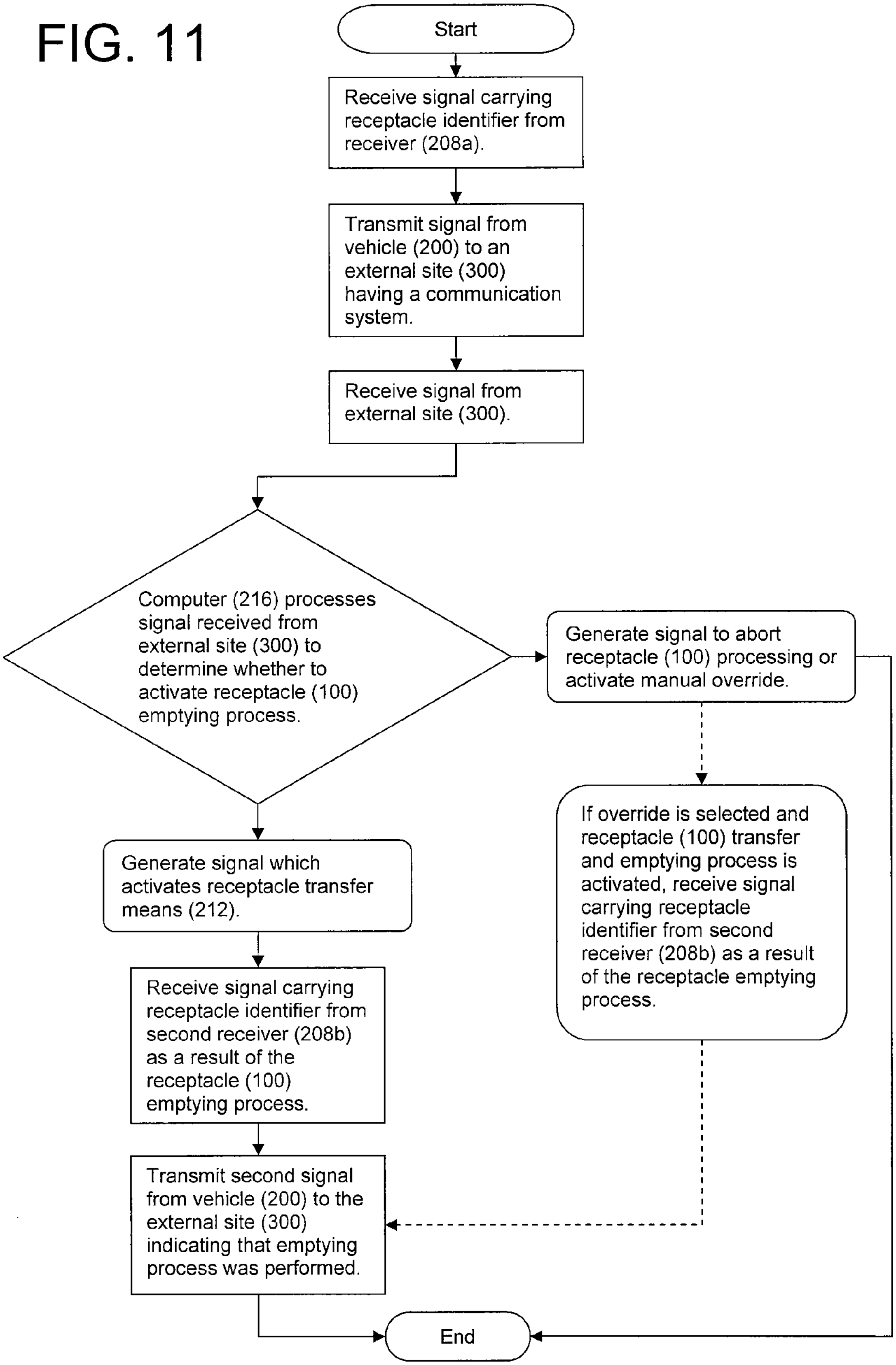
FIG. 11 is a flowchart of a process of an on-board computer.

Referring specifically to FIG. 11, a flowchart of a process of the on-board computer 216 is illustrated. Here, the communication or data link between the receivers 208*a,b* and the external site 300 is a module or routine provided by the computer 216. This process comprises receiving a signal carrying the receptacle identifier from the first receiver 208*a*. The computer 216 then transmits a signal from the vehicle 200 to the external site 300. Once the data has been analyzed at the external site 300, the computer 216 receives a return signal from the external site 300 and determines whether to activate the transfer means 212 or require an override to empty the receptacle 100. If the transfer means 212 is activated, either automatically or manually via override, the second receiver 208*b* will send a signal to the computer 216. The computer 216 transmits a second signal to the external site 300 indicating that the emptying event has taken place.

Figure 12:
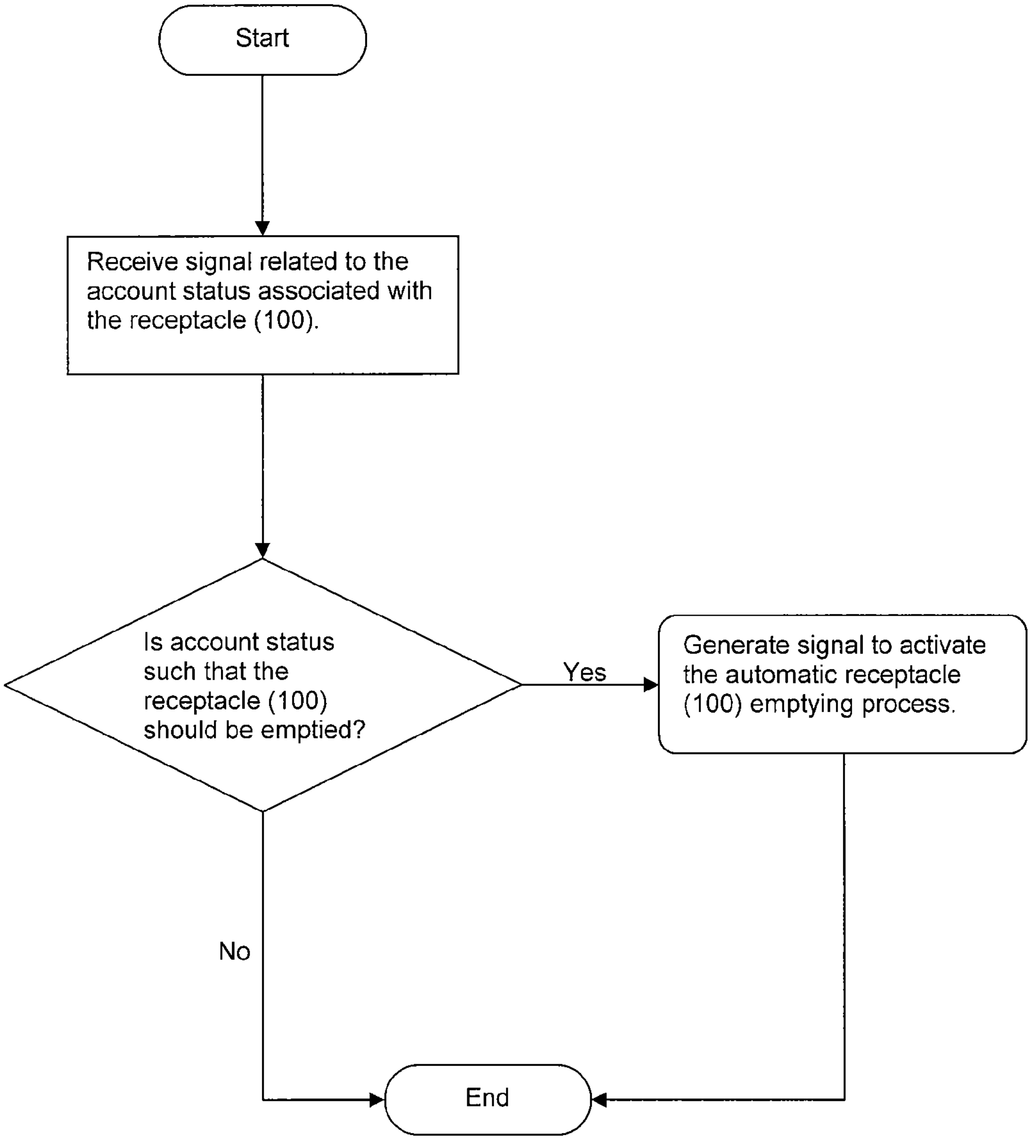
FIG. 12 is a flowchart of a process for controlling automatic receptacle emptying carried out by an on-board computer.

Referring specifically to FIG. 12, a process for controlling the transfer means 212 is illustrated. This process may be performed by the on-board computer 216 or by an existing controller 214 in communication with the on-board computer 216. The computer 216 receives a signal related to or determined by an account status associated with the receptacle. If the account status is such that the receptacle should be emptied, i.e. current, a signal is generated to automatically energize the transfer means 212. If the account status is not current, the process ends.

Figure 15:
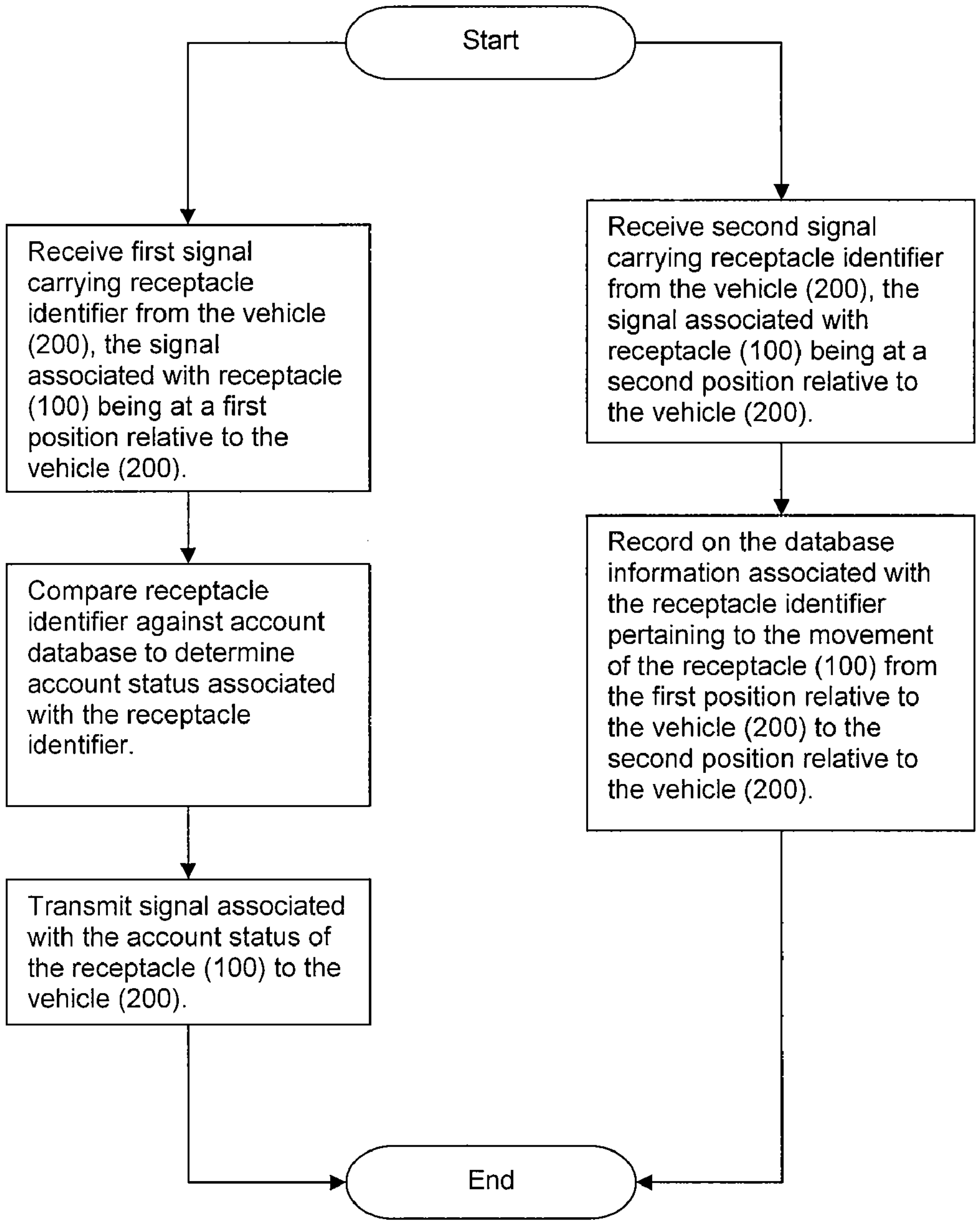
FIG. 15 is a flowchart of a communication process carried out by an on-board computer.

Referring to FIG. 15, a process of the computer 304 of the external site 300 is illustrated. The main purpose of the server 302 and/or the computer 304 of the external site 300 is to hold or have the capability of accessing a database 306, the database 306 including an association between receptacle identity, ownership or responsibility, and account status. In terms of the overall system or method of the invention, the external site 300 communicates with the vehicle 200 by receiving and sending signals.

For example, the external site 300 receives a first signal carrying a receptacle identifier from the vehicle 200. This first signal is associated with the receptacle 100 being located at the first position. The first signal originates with, though is not necessarily identical to, the signal received from the transmitter means 102 at the first receiver 208*a*. A module at the external site 300, preferably on the computer 304, compares the data carried by the signal against account information on the database 306 to determine an account status associated with the receptacle identifier. The result of the comparison, i.e. the account status, is transmitted from the external site 300 back to the vehicle.

Further, the external site 300 receives a second signal from the vehicle 200. This second signal is associated with the receptacle 100 being located at the second position. The second signal originates with, though is not necessarily identical to, the signal received from the transmitter means 102 at second receiver 208*b*. A module at the external site 300, preferably on the computer 304, compares the data carried by the signal against account information on the database 306 and records an event, the emptying of the receptacle 100, in connection with the receptacle 100.

While the specific embodiments have been illustrated and described, numerous modifications come to mind without significantly departing from the spirit of the invention, and the scope of protection is only limited by the scope of the accompanying Claims.

What is claimed is:

1. A vehicle for removing and hauling waste, the vehicle comprising:

a waste bin located above a baseline, the waste bin having a chamber and an emptying site;

a waste receptacle transfer means driven from a first position associated with the baseline to a second position associated with the emptying site of the waste bin and back to the first position, wherein a waste receptacle is temporarily retainable to the waste receptacle transfer means and transferrable by the waste receptacle transfer means from the first position to the second position to spill a contents of the waste receptacle into the waste bin at the emptying site and back to the first position;

a first receiver associated with the first position for receiving a signal generated by the waste receptacle at a first moment in time when the waste receptacle transfer means is in the first position and at a second moment in time when the waste receptacle transfer means has returned to the first position from second position;

an on-board data link for receiving a first signal from the first receiver and transmitting a data signal carrying information associated with the identity of the waste receptacle to an external site; and an on-board controller in communication with the external site for receiving a signal from the external site regarding an account status associated with the waste receptacle wherein the on-board controller allows movement of the waste receptacle transfer means to the second position upon receipt of a pass condition signal or alternatively locks out movement of the waste receptacle transfer means upon a receipt a fail condition signal.

2. The vehicle of claim 1 further comprising:

a second receiver associated with the second position of the waste receptacle transfer means for receiving the signal generated by the waste receptacle.

3. The vehicle of claim 2 further comprising:

an on-board graphic interface in communication with the on-board data link for communicating messages associated with the waste receptacle identity to the vehicle from the external site.

4. The vehicle of claim 3 wherein the on-board data link is further for receiving a second signal from the second receiver associated with the identity of the waste receptacle and transmitting a second data signal carrying information associated with the identity of the waste receptacle to the external site.

5. The vehicle of claim 4 wherein the first data signal carrying information associated with the identity of the waste receptacle is transmitted to the external site when the waste receptacle is in the first position.

6. The vehicle of claim 5 wherein the second data signal carrying information associated with the identity of the waste receptacle is transmitted to the external site when the waste receptacle is in the second position.

7. The vehicle of claim 1 wherein the first receiver is located at a position on the vehicle chosen from a group consisting of: a front portion of the vehicle, a side portion of the vehicle, or a rear portion of the vehicle.

8. The vehicle of claim 2 wherein the second receiver is located at a position of the vehicle chosen from the group consisting of: an upper portion of the waste bin, an upper portion of a cab of the vehicle, and a rear portion of the vehicle.

9. A vehicle for removing and hauling waste, the vehicle comprising:

a waste bin located above a baseline, the waste bin having a chamber and an emptying site;

an arm driven from a first position associated with the baseline to a second position associated with the emptying site of the waste bin and back to the first position, wherein a waste receptacle is temporarily retainable to the arm and transferrable by the arm from the first position to the second position to spill a contents of the waste receptacle into the waste bin at the emptying site and back to the first position;

a first receiver associated with the first position of the arm for receiving a signal generated by the waste receptacle; and a second receiver associated with the second position of the arm for receiving the signal generated by the waste receptacle.

10. The vehicle of claim 9 further comprising:

an on-board data link for receiving a first signal from the first receiver and transmitting a data signal carrying information associated with the identity of the waste receptacle to an external site.

11. The vehicle of claim 10 further comprising:

an on-board controller in communication with the external site for receiving a signal from the external site regarding an account status associated with the waste receptacle wherein the on-board controller allows movement of the arm to the second position upon receipt of a pass condition signal or alternatively locks out movement of the arm upon a receipt a fail condition signal.

12. The vehicle of claim 11 wherein the on-board data link is further for receiving a second signal from the second receiver associated with the identity of the waste receptacle and transmitting a second data signal carrying information associated with the identity of the waste receptacle to the external site.

13. The vehicle of claim 10 wherein the first data signal is transmitted to the external site when the arm is in the first position.

14. The vehicle of claim 13 wherein the second data signal is transmitted to the external site when the arm is in the second position.

15. A vehicle for removing and hauling waste, the vehicle comprising:

a waste bin located above a baseline, the waste bin having a chamber and an emptying site;

a waste bin transfer means driven from a first position associated with the baseline to a second position located above the baseline on the vehicle, wherein the waste bin is temporarily retainable to the waste bin transfer means and transferrable by the waste bin transfer means from the first position to the second position to fix the waste bin at the second position on the vehicle for transporting the waste bin to a new location; and a first receiver associated with the first position for receiving a signal generated by the waste bin at a first moment in time when the waste bin is in the first position.

16. The vehicle of claim 15 further comprising:

a second receiver associated with the second position for receiving the signal generated by the waste bin at a second moment in time when the waste bin is in the second position.

17. The vehicle of claim 16 further comprising:

an on-board data link for receiving a first signal from the first receiver and transmitting a data signal carrying information associated with the identity of the waste bin to an external site.

18. The vehicle of claim 17 further comprising:

an on-board controller in communication with the external site for receiving a signal from the external site regarding an account status associated with the waste bin wherein the on-board controller allows movement of the waste bin transfer means to move the waste bin from the first position to the second position upon receipt of a pass condition signal or alternatively locks out movement of the waste bin transfer means upon a receipt a fail condition signal.

19. The vehicle of claim 18 further comprising:

an on-board graphic interface in communication with the on-board data link for communicating messages associated with the waste bin identity to the vehicle from the external site.

20. The vehicle of claim 19 wherein the on-board data link is further for receiving a second signal from the second receiver associated with the identity of the waste bin and transmitting a second data signal carrying information associated with the identity of the waste bin to the external site.

21. The vehicle of claim 20 wherein the first data signal is transmitted to the external site when the waste bin is in the first position.

22. The vehicle of claim 21 wherein the second data signal is transmitted to the external site when the waste bin is in the second position.

* * * * *